United States Patent [19]
Magee

[11] Patent Number: 5,680,734
[45] Date of Patent: Oct. 28, 1997

[54] SOLAR ENERGY CONTROL FILM AND PROCESS

[75] Inventor: John Allen Magee, Fayetteville, Ark.

[73] Assignee: University of Arkansas N.A., Little Rock, Ark.

[21] Appl. No.: 779,646

[22] Filed: Oct. 21, 1991

Related U.S. Application Data

[63] Continuation-in-part of Ser. No. 524,975, May 18, 1990, abandoned.

[51] Int. Cl.⁶ .................................................. E04D 1/00
[52] U.S. Cl. ...................... 52/553; 52/606; 359/613; 126/698; 126/685
[58] Field of Search ................. 52/306, 606, 553, 52/309.1, 173 R; 359/167, 442, 445, 446, 463, 613; 126/685, 698, 700

[56] References Cited

U.S. PATENT DOCUMENTS

| | | |
|---|---|---|
| 3,012,477 | 12/1961 | Lodge ..................... 52/306 X |
| 3,255,665 | 6/1966 | Weiher et al. . |
| 3,653,138 | 4/1972 | Cooper . |
| 4,021,945 | 5/1977 | Sussman . |
| 4,069,809 | 1/1978 | Strand ..................... 52/606 X |
| 4,279,244 | 7/1981 | McAlister ............... 126/698 X |
| 4,305,383 | 12/1981 | Bloxsom ............... 126/698 X |
| 4,307,710 | 12/1981 | Natler ..................... 126/700 |
| 4,327,708 | 5/1982 | Taylor . |
| 4,461,278 | 7/1984 | Mori ........................ 126/700 |
| 4,557,253 | 12/1985 | Talbert et al. . |

FOREIGN PATENT DOCUMENTS

| | | |
|---|---|---|
| 569237 | 7/1958 | Belgium ....................... 52/306 |

*Primary Examiner*—Lanna Mai
*Attorney, Agent, or Firm*—Head & Johnson, P.A.; Robert R. Keegan

[57] ABSTRACT

There is disclosed a solar energy control film and a siding panel to which such film is applied, the film having a multiplicity of lenticular lenses formed on one side thereof which are preferable about one-tenth to one millimeter wide and having on the surface opposite to that with the lenticular lenses an array of masking indentations in register with the lenticular lenses so that the film is effectively transparent for the passage of light (solar radiation passing through to an absorbing heat collector) only for rays impinging on a structure at prescribed elevation angles. Typically the masking indentations would be arranged to pass light at a low elevation angle corresponding to wintertime solar elevation at the latitude at which the structure is located. In particular embodiments, the indentations in the film are rendered non-transparent by being filled with a liquid or semi-liquid material including pigments or dyes to impart opacity, and in most cases reflectivity, to the material. A preferred method of forming the film is by simultaneously embossing the back and front surfaces with the indentations and lenticular lens configurations to assure highly accurate placement and registration, and thereby accurately control the angle range for which the film will be transparent to solar radiation. The space between indentations on the back surface of the film may be rendered and maintained transparent by pressing a transparent flat sheet or other sheet onto the back surface after the indentations have been filled or partly filled with the opaque liquid or semi-liquid material.

7 Claims, 6 Drawing Sheets

SOLAR ENERGY CONTROL FILM AND PROCESS

This application is a continuation in part of application Ser. No. 07/524,975 filed May 18, 1990 titled SIDING OR ROOFING EXTERIOR PANELS FOR CONTROLLED SOLAR HEATING, now abandoned.

The present invention relates to solar heating for residential buildings or other buildings wherein the exterior walls, windows, and/or roof on the sunny side of the structure are formed in a manner to act as solar heat collecting apparatus. While it is obviously desirable to be able to cover essentially the entire sunny side of a structure with solar heat collection apparatus, there have been serious problems standing in the way from a practical point of view. First of all, solar collection apparatus inherintantly must have a solar absorbing surface and consequently generally has a dark color which is very unattractive. Any attempts to make the solar collection apparatus less unattractive generally has severely impacted on its efficiency and effectiveness. Even if unattractive appearance is accepted as inevitable, the capital cost of conventional solar heat collection apparatus for such a large area would be quite high to achieve even moderately food energy collection efficiency.

The present invention provides a solar energy control film having lenses formed therein which allow passage of light (solar radiation) through to an absorbing heat collector only for rays impinging on the structure at a low elevation angle corresponding to wintertime solar elevation at the latitude at which the structure is located. In particular embodiments, such a film applied to a siding panel causes light rays striking the panel at near horizontal elevation to impinge on a mask portion which has a desired color for decorative purposes. By the principle of reciprocity, a viewer of the structure would see light reflected from this light colored portion of the mask with the result that the siding would appear to have a white color or other desired color for decorative purposes to the passerby; this notwithstanding the fact that the sun at high elevation angles would "see" the black or dark colored surface of a heat collector.

In certain preferred embodiments a dark heat collector surface is not incorporated in the siding to which the film is applied but is spaced a small distance, usually less than an inch, behind the partially transparent siding with the result that the system has the well-known greenhouse effect. Thereby long-wave radiation from the dark heat collector surface cannot exit through the plastic siding and is trapped, while there is virtually no impediment to incoming visible and near infrared radiation from the sun.

Another feature of the solar energy control film as used in a solar heating system avoids heat loading by causing the mask in the film to have a highly reflective portion which is in the path of rays focussed by the lens from high elevation angles of the sun during summer months when heat transfer to the interior of the structure is not desired. Thus, from the aspect of the summer sun, the wall of the house with siding panels (or windows) according to the invention is effectively white or generally reflecting, for the winter sun it is dark and highly absorbing, and to the passerby viewing the house from near or below horizontal it appears to be white (or a color selected for decorative purposes).

The problems for which the system of the present invention provides solutions have been recognized to some degree by prior workers in the field. It has been proposed to use conventional metal siding on a housing structure with a space provided between the metal wall formed by the siding and the insulated wall of the house for the passage of air flow. Depending on the color of the metal siding, this provided a more or less efficient heat collector which could be used to transfer heat to air circulated between the metal siding and the insulated wall of the structure. U.S. Pat. No. 4,557,253 to Talbert et al. dated Dec. 10, 1985, Class 126/429, shows such a structure with vertical air flow. It will be noted that the Talbert et al. structure does not have the advantage of the greenhouse effect and does little to overcome the summer heat loading disadvantages discussed above. An arrangement with solar siding elements of very thin, high heat conductive sheet material and with air passages between such material and the outer surface of the building wall is shown in U.S. Pat. No. 4,327,708 to Taylor issued May 4, 1982, Class 126/429. The system described in the Taylor patent likewise does not have the advantage of the greenhouse effect and seeks to counteract the summer heat loading effect by providing a discharge for heated air into the atmosphere during summer months.

U.S. Pat. No. 3,255,665 to Welher et al. issued May 4, 1982, Class 88—60, shows an article of manufacture for controlling light transmittance utilizing prisms and total internal reflection to prevent light from passing therethrough beyond some predetermined angle of incidence; no lenses are employed.

The basic physical principles whereby light impinging on a lenticular lens system or other lens system, or conversely light passing back out through such a system, is controlled to produce desired visual affects is well known, and is described in detail for example in U.S. Pat. No. 3,241,429 to Rice et al. Class 88—1. The Rice patent describes the structure and operation of toys or novelties in which a lenticular lens covered picture will have a different appearance when viewed from different angles, and may thus give a moving picture effect when tilted back and forth, example. The same basic physical principles are utilized in forming the thin solar energy control film of the present invention with the result that siding panels on which the film is applied would appear to be black if viewed from a small angle above horizontal and would appear to be white if viewed from a large angle above horizontal. Nothing in the patent to Rice et al. would suggest the use of this very old lenticular lens principle to achieve the novel results accruing from use of solar energy control film according to the present invention.

In addition to providing the features and advantages described above, it is an object of the present invention to provide a solar energy control film which transmits solar radiation to a heat collector or other energy converter for certain sun elevation angles while causing such radiation to be reelected without significant absorption for other solar elevation angles.

It is another object of the present invention to provide transparent plastic exterior panels for a residential building or other building having a multiplicity of lenses formed in a solar energy control film applied thereto to selectively permit transmission of solar radiation only for certain angles of impingement of light on such panels.

It is still another object of the present invention to provide a solar energy control film to be applied to windows, exterior siding, or roofing panels formed of transparent material, said film having lenticular lenses with a radius of curvature less than about one millimeter causing different horizontal bands on the back the film to be visible depending on the angle of elevation from which the panel is viewed.

It is yet another object of the present invention to provide a solar energy control film and method for production thereof having lenticular lenses embossed on one surface thereof, and on the opposite surface thereof indentations appropriately in register with the lenticular lenses, so that solar radiation passes through a predetermined range of impingement angle with little or no attenuation while radiation having other impingement angles is blocked and at least partially reflected at the locations of the indentations.

It is still a further object of the present invention to provide a solar radiation control film and method as described above wherein the indentations are at least partially filled with pigmented liquid or semi-liquid material and a further layer of transparent film is pressed on and adhered to the back surface to cause the unindented portion of the embossed film to be rendered highly transparent.

Other objects and advantages of the present invention will be apparent from consideration of the following description in conjunction with the appended drawings in which:

Figure 1:
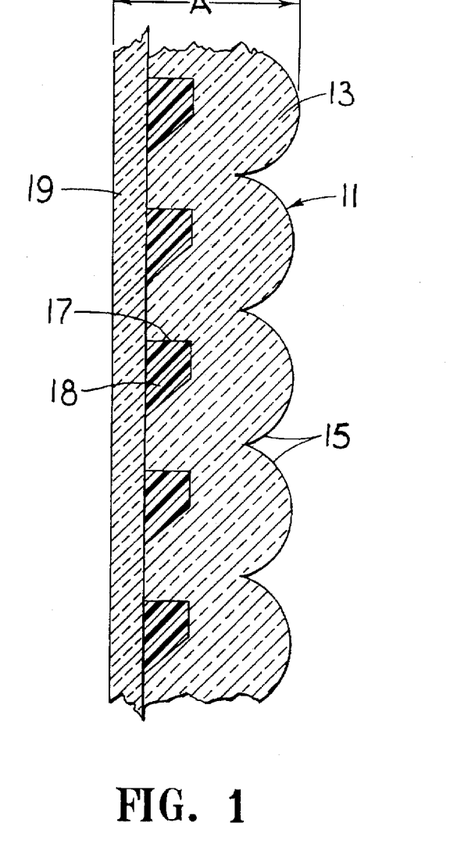
FIG. 1 is an enlarged sectional view of solar energy control film according to the invention.

Referring now to the drawings, and particularly to FIG. 1, a solar energy control film 11 according to the invention is shown in cross-section wherein a first transparent plastic sheet 13 has been provided, by embossing or otherwise, with lenticular lenses in the form of ridges 15.

The surface opposite to the surface having ridges 15 is provided with indentations 17 with the same spatial frequency as ridges 15 and in registry therewith.

Each indentation 17 is filled or partially filled with an opaque, preferably reflective, material is which may be liquid, semi-liquid, or solid in form. Sheet 13 is overlaid on its backside (left side in FIG. 1) with a transparent flat sheet 19. Sheet 19 preferably has an index of refraction approximately the same as the plastic of sheet 13, and the two are adhered together with a very thin layer of adhesive material, or otherwise, so that light is transmitted through the junction between sheet 13 and sheet 19 with very little reflection or loss.

A preferred material for sheet 13 is polycarbonate plastic. Other suitable materials in particular circumstances include polyvinyl chloride, pvc with UV inhibitors, acrylic plastic, and other thermoplastic transparent materials.

Suitable compositions for opaque material 18 may include polyether plastics, cellulosic plastics, or one of the above mentioned plastics with a solvent to render it liquid or semi-liquid, and with a dye or coloring agent dispersed therein such as calcium carbonate, magnesium oxide, or a conventional white pigment or dye.

Plastic sheet 19 is preferably formed of the same material as plastic sheet 13, or may alternatively be formed of polyvinyl chloride, acetates, polyethylene, polypropylene, or acrylic plastic.

The film 11 in FIG. 1 may have a total thickness indicated at A from 0.01 inches (0.25 millimeters) to 0.2 inches (5 millimeters). Typically the radius of the lenses formed by ridges 15 will be about ⅓ of such total thickness. It should be noted that the thickness of the flat transparent sheet 19 is about one-third of the total thickness, but this dimension is variable within wide limits, and in certain limited applications the sheet 19 could be omitted entirely.

Figure 2:
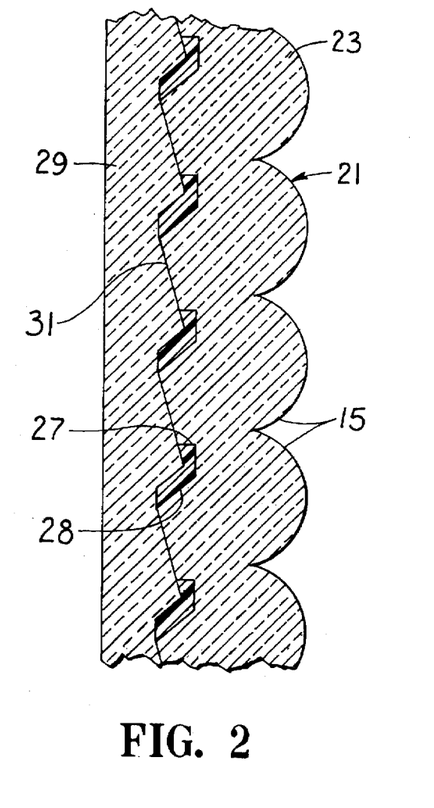
FIG. 2 is an enlarged sectional view of an alternative form of solar energy control film according to the invention.

Although the preferred form of solar energy control film is shown in FIG. 1, an alternative embodiment shown in FIG. 2 has certain advantages for particular applications. A transparent plastic sheet 23 again has on its front side lenticular lenses the form of ridges 15. The back surface of the sheet 23 has a somewhat different configuration than that shown in FIG. 1. It is similar in that an indentation 27 is provided which is filled or partially filled with an opaque, preferably reflective, material 28. However, the back surface of the sheet 23 is not planar, but is formed of a plurality of flat surfaces 31 acting as windows and typically having an angle of orientation of about 15°. On the back of control film 21 is a sheet material 29 provided with a plurality of complimentary flat surfaces which mate with the surfaces 31 to produce windows having minimal reflection or absorption for light entering through the ridged front surface of the film 21.

Figure 3:
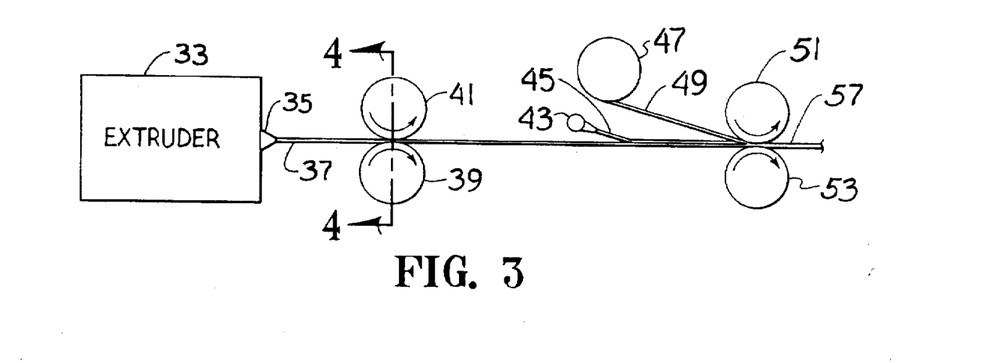
FIG. 3 is a schematic diagram showing an embossing and mask-forming apparatus and method suitable for manufacturing the film structures of FIGS. 1 and 2.
Figure 4:
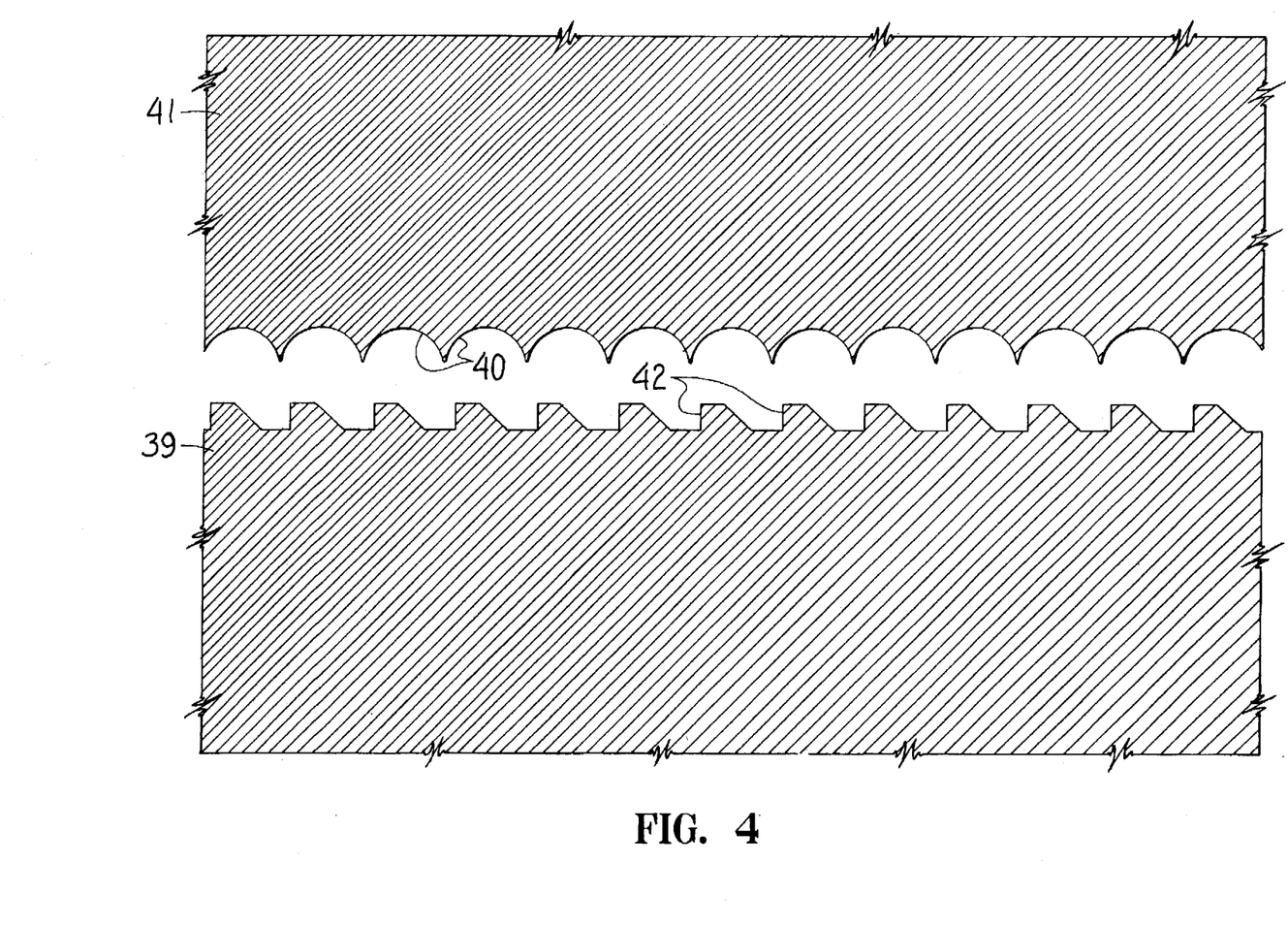
FIG. 4 is an enlarged cross-sectional view showing the detailed structure of the embossing rolls of FIG. 3.

As previously mentioned, the configuration of the solar energy control film 11 as shown in FIG. 1, or film 21 as shown in FIG. 2, is particularly well suited to economical manufacture because registration between lens forming ridges 15, opaque elements 18, or windows 31 can be assured in a single embossing operation by which the sheet material 13 or 23 is formed. FIG. 3 shows a schematic illustration of a configuration of conventional manufacturing apparatus which is suitable for forming solar energy control film as shown in FIG. 1. A sheet extruder 33 of conventional form extrudes a thin sheet 37 of plastic sheet material through a nozzle 35. The sheet 37 may be from about one foot to several feet in width, and as illustrated may be about 0.04 inches (1 millimeter) thick. The sheet 37 passes immediately to embossing rollers 41 and 39 which are chilled rollers typically having a configuration as shown in FIG. 4 thereby shaping the sheet 37 in a manner similar to that shown for sheet 13 in FIG. 1. Alternatively, the extrusion process could be carried out separately and the sheet material 37 could be reheated before passing through chilled rollers 41 and 39 for the embossing process.

As shown in FIG. 4 it is preferred that embossing is done to produce the ridges 15 parallel to the direction of travel of sheet 37. Thus, it is a simple matter to control registration of indentation 17 relative to ridges 15 by adjusting and fixing the relative position of arcuate grooves 40 relative to projections 42 as shown in FIG. 4. Embossing rollers such as 39 and 41 are sometimes machined with a helical cut for production of grooves 40 or projections 42, in which case the direction of the cuts, their pitch and the diameters of rolls 39 and 41 must be matched so that the registration will be maintained as rolls 39 and 41 turn at the same speed. Of course, if the grooves 40 and the projections 42 are cut as a series of circular elements rather than helically, the relative rotational position of rolls 39 and 41 is of no consequence.

Figure 5:
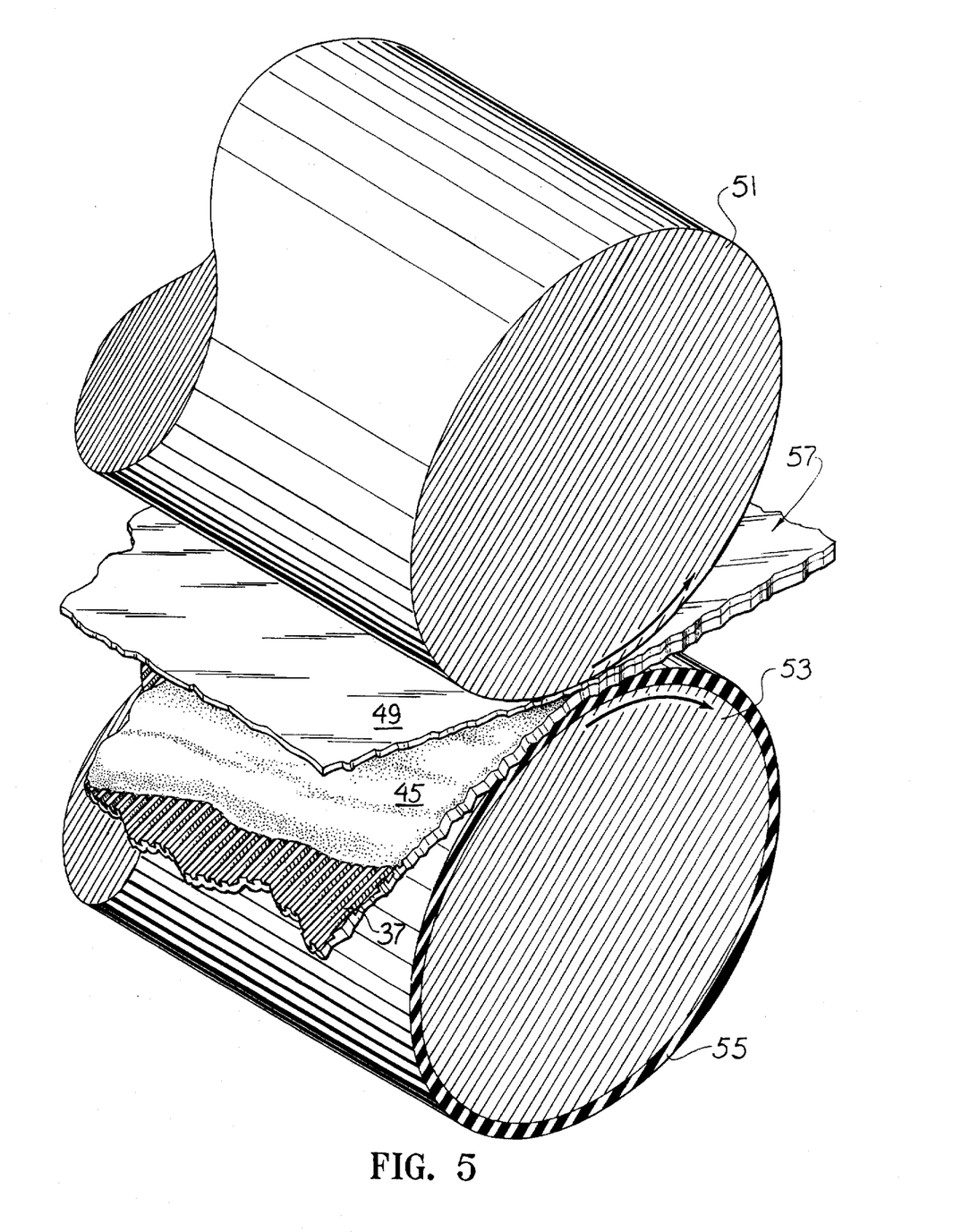
FIG. 5 is a fragmentary perspective view showing the detailed structure of mask-forming rolls of FIG. 3.

It may be desired to provide additional cooling (not shown in FIG. 3) for sheet 37 after passing through rolls 39 and 41. Sheet 37 could be rolled and stored for further processing, but it is more convenient to finish the film in a continuous operation by applying a liquid or semi-liquid opaque material 45 from a supply nozzle 43 to substantially cover the back side of sheet 37 as shown in FIG. 5. A backing sheet 49 (corresponding to sheet material 19) is then laid down on sheet 37 from a supply roll 47, after which the sheets are pressed together by nip rolls 51 and 53. Roll 53 is preferably provided with a cushioning pad 55 of rubber or other elastomeric material to prevent damage or distortion to the lens forming ridge elements such as 15. The quantity of liquid or semi-liquid material 45 controlled so that indentations such as 17 are filled or nearly filled while the pressure between rollers 51 and 53 assures that any such material is squeezed out from between the flat surfaces of sheets 13 and 19 to the point where the interface between the sheets is substantially transparent. At the same time it is preferable that the semi-liquid or liquid material 45 have adhesive properties which prevent the sheets 13 and 19 from separating and; eventually cures to bond the two sheets into a finished solar energy control film 57.

It should be mentioned that the alternative embodiment of FIG. 2 would be produced in a similar fashion except that backing sheet 49 would be preembossed as shown in FIG. 2. Little or no provision is required for aligning an embossed backing sheet 29 with lenticular lens sheet 23 because the pressing operation naturally causes the two sheets to assume the configuration shown in FIG. 2.

Thus, It will be seen from FIGS. 3, 4, and 5 that an important advantage of the configuration of solar energy control film shown in FIGS. 1 and 2 is the ease with which such film can be manufactured by conventional processes, and the fact that film having very small lenticular lens radii down to 0.01 inches can be employed with ease because the lenses and the mask forming elements are produced and located in a single operation of embossing or the like.

Figure 6:
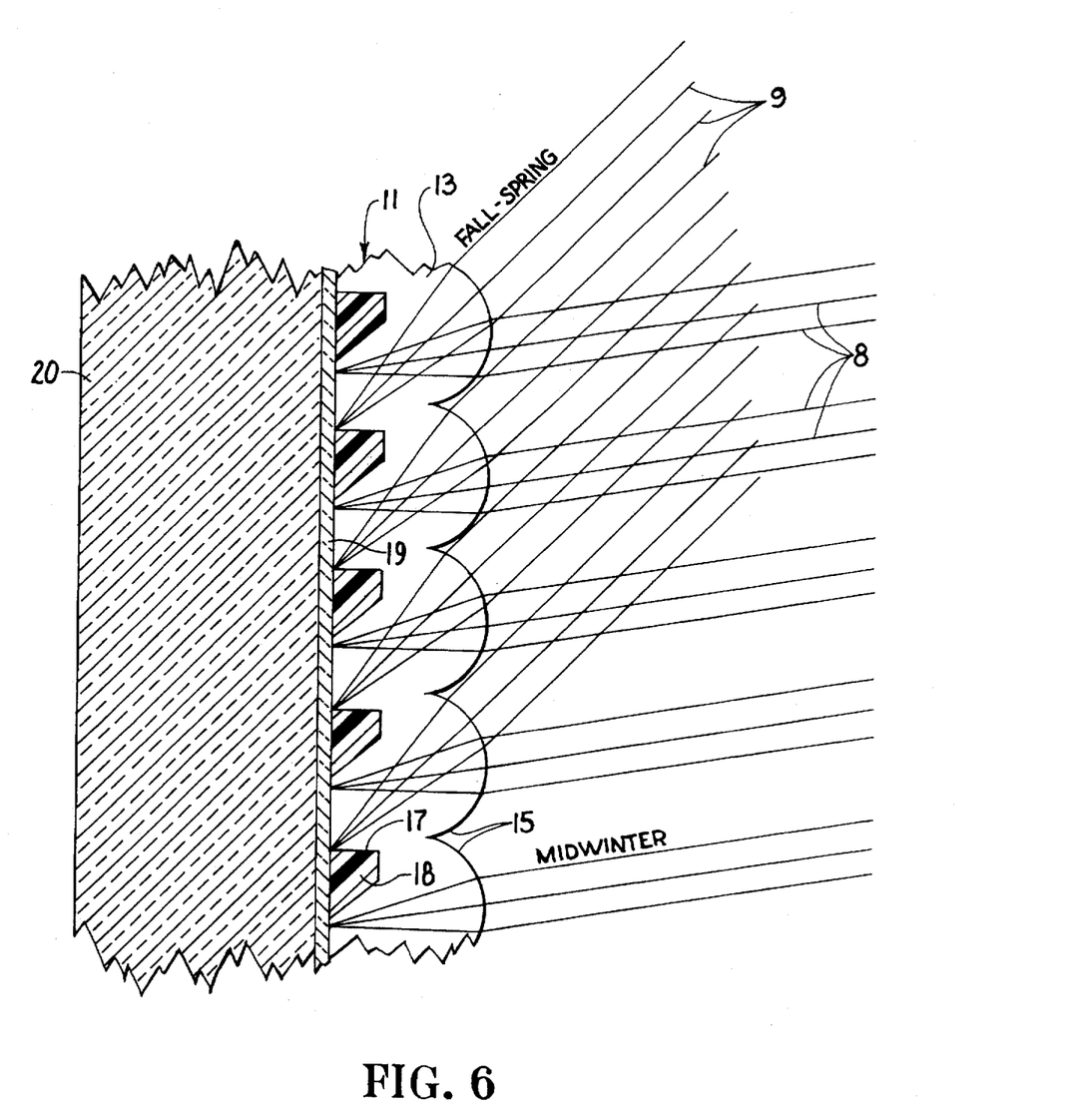
FIGS. 6 and 7 are schematic diagrams of alternative mask configurations for solar control film lenticular lens arrays according to the invention.

FIG. 6 shows an enlarged schematic representation of solar energy control film 11 emplaced on a transparent substrate 20; lens forming ridges would be typically of a radius of about one millimeter or 1/25 inch. Normally, the radius of curvature would be determined by the refractive index of the transparent plastic material and the desired thickness of film 11 so that the focal distance for parallel rays within the transparent plastic material 13 would cause them to focus at or near the back side thereof. Theoretically there is no minimum radius of curvature, but the mask should be positioned close to the focal position of the solar rays and radii of much less than 0.1 millimeters would probably be impractical in this embodiment.

One particular form of mask is shown in FIGS. 1 and 6 wherein the solar energy control film 11 has transparent windows formed by the smooth surface of the plastic material 13 in intimate contact with transparent sheet 19.

The indentation 17 in the sheet 13 may be filled with an opaque plastic material which would give the film 11 greater strength. This would not affect the optical masking function of film 11 illustrated in FIG. 6. From FIG. 6 it will be seen that light rays striking the film 11 at an angle of elevation above about 55° will strike the reflective material of elements 18 which prerably includes a white, diffusely reflective pigment or other material with a high coefficient of reflection. Very little of the light diffusely reflected from elements 18 passes through transparent sheet 19; thus for direct sunlight at high elevation angles the film 11 has the same solar energy reflecting characteristics as a highly reflective white surface. To the extent that any energy is absorbed by surface elements 18 it is not readily transmitted through film 11.

As the elevation of solar rays striking film 11 decreases from the elevation of rays shown at 9, the focal position shifts, and the focal position begins to fall on the window of sheet 13 causing solar energy to be transmitted through sheet 19. Although there will be a transitional range of angles where part of the radiation is transmitted and part is reflected, this transitional range of angles may be small, limited to a few degrees or less, because images of the sun are focused or nearly focused at the interface of sheets 13 and 19. Of course, for any one lenticular lens the images are spread horizontally along its length.

It should further be noted that while the image of the sun is focused or nearly focused on the windows on the back side of sheet 13, very little of the energy is absorbed, and thus, there is no substantial temperature rise despite intense energy concentration. Temperature rise is avoided on the surface of elements 18 in part because it is reflective, but also the solar rays are not in focus and the energy concentration is consequently less than at the focal point of one of the lenses formed by ridges 15.

As the solar rays elevation decreases from about 55° as represented by the rays 9 to about 20° as represented by the rays 8, all or nearly all of the direct solar radiation is transmitted through film 11.

The mask represented by indentation 17 in FIG. 6 is three dimensional. A protrusion of elements 18 into the body of the sheet 13 causes rays with elevation angles greater than that of the rays 9 to be intercepted and reflected which would otherwise have been directed to and through the next lower one of the intervening windows as seen from FIG. 6; thus the three dimensional configuration of elements 18 permits the lens array and mask arrangement to be operational over a wide range of angles in a desired manner. While the three dimensional mask configuration is not essential to function of apparatus according to the invention, a simple one dimensional mask, stripes printed between windows 31 for example, would tend to allow high angle radiation to leak through the panel by falling below the mask stripe intended to intercept it onto the subadjacent window. While this could be acceptable in certain applications, it would be quite undesirable for the solar siding application.

Figure 9:
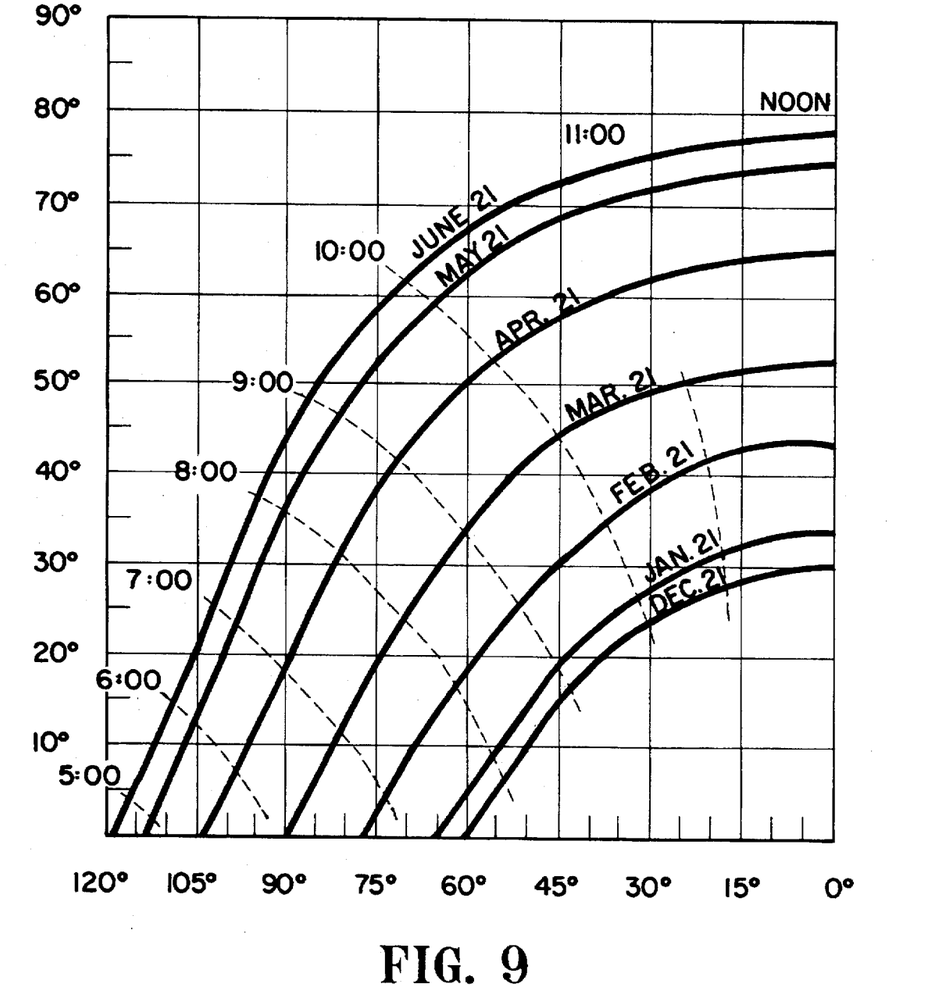
FIG. 9 is a diagram of solar elevation and azimuth angles presented for a better understanding of the invention.

The significance of this selected transmission of solar radiation at particular elevation angles can better be understood by reference to FIG. 9 showing approximate direct radiation elevation and azimuth angles at various times of day and at various times of the year, FIG. 9 shows only six months of the year and only the morning hours, it being understood that elevation angles of the time of day are symmetrical about 12 noon and elevation angles for time of the year are symmetrical about June 21.

The diagram in FIG. 9 is for a latitude of approximately 36° and it will be understood that for high latitudes the elevation angles will be lower, while for lower latitudes the elevation angles will be higher. The diagram of FIG. 9 is intended for the Northern Hemisphere, and in the Southern Hemisphere sunny walls would be the Northern walls and the winter solstice (lowest sun elevation) would be about June 21, while the summer solstice (highest sun elevation) would be about December 21.

The elevation angles of FIG. 6 are the elevation angles at 12 noon indicated in FIG. 9 at 0°. This does not mean, however, that the angle relationships of FIG. 6 are appropriate only at noon because the significant angle of solar radiation on a South facing wall is not the true elevation angle but the projection of the direct solar radiation vector on the North-South vertical plane. During the winter daylight hours this projected angle does not differ greatly from the 12 noon true elevation angle as shown in FIG. 9.

Taking specific values from FIG. 9, the elevation angle for December 21 is the lowest angle and is approximately 30°. Direct solar radiation at winter solstice at 36° latitude is 30° compared to the minimum angle of transmission of 20° indicated by rays 8 in FIG. 6.

However, in a typical application, the structure of film 11 and its attachment to siding panels on a vertical wall will cause the lenses forming ridges 15 to be tilted at an angle of up to about 10° from the vertical, and hence, the solar radiation elevation angle corresponding to rays 8 would be 30% and just within the acceptance angle of windows of film 11 when affixed to a vertical wall at a 10° angle.

Assuming the same 10° tilt angle for film 11, the other end of the acceptance range represented by rays 9 would be an actual solar radiation angle of 50°. Referring to FIG. 9 it will be seen that this represents a date of early March for cut-off of solar radiation which would generally avoid heat loading the structure at a time of year when outside temperatures might require air conditioner operation. Solar radiation transmission would resume about late September.

It will be appreciated that ideally the optical configuration of film 11 could be varied to produce an abrupt or a gradual cut-off of direct solar radiation according to a time table best suited to the climate in which the structure was located, relative costs of heating and cooling, and many other factors. In practice it will probably be sufficient to produce panels which are generally suitable for ranges of 5° in geographic latitude (e.g. 20°–24°, 25°–29°, 30°–34°, 35°–40°, etc.). While systems employing controlled solar heating are not contemplated to be particularly useful in tropical latitudes, certain roof panels employing features of the invention could find use in such latitudes.

Referring again to FIG. 6, it will be noted that while it is not intended for solar radiation to impinge on the bottom surfaces of elements 18, light rays at an elevation angle lower than rays 8 in FIG. 6 would strike such surfaces. By the optics principle of reciprocity a passerby viewing the film 11 from an eye elevation angle less than the angle of rays 8 down to very large negative elevation angles would see light diffusely reflected from some portion of elements 18. Therefore, according to the invention, it is desirable to cause such surfaces to be selectively reflecting a desired color so that film 11 would appear to passersby at any normal eye elevation angle to have the color of such surface. The surface elements 18 may be colored to match or harmonize with the color of other siding on walls for which conventional siding rather than controlled solar heating panels were used. Normally the color of such surfaces will not affect the selective radiation transmission function of film 11.

While the arrangement illustrated in FIGS. 1, 2 and 6 has contemplated that film 11 would be tilted with respect to the vertical by a small definite angle, it is apparent that the relative location of indentations 17 could be shifted to provide virtually any variation in the acceptance angles for solar radiation that is desired. Thus arrays of lenses forming ridges 15 could be incorporated in film on vertical windows for greenhouses or for other structures, or could be incorporated in non-vertical windows or skylights with simple modifications of the mask arrangement in accordance with known principles of the optical art.

Figure 7:
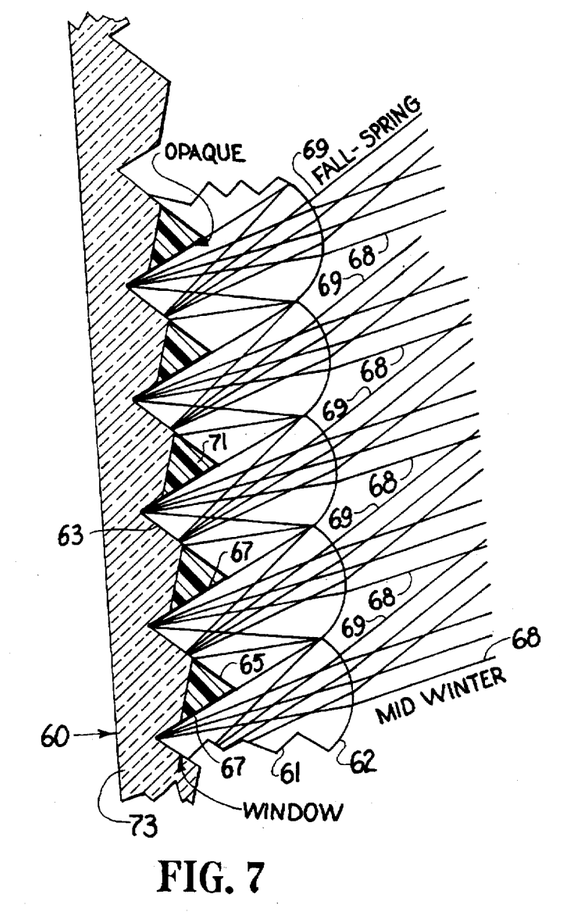

FIG. 7 shows an alternative embodiment of solar energy control film 60 having a lenticular lens and mask structure similar to the embodiment of FIG. 5 of the parent application of which this application is a continuation-in-part. Such application is incorporated by reference to the extent not herein reproduced. Film 60 includes a front plastic material sheet 61 having an array of cylindrical lenses 62 and wherein the back side of such sheet 61 is of serrated shape. Each indentation on the back of sheet 61 has a transparent window 63, a reflective mask portion 65 which is preferably highly reflective, and a further mask portion 67. Mask portion 67 need not be highly reflective and may have a color coding applied thereto by spraying or other process; this would allow the color of the mask portion 67 to be selected for decorative purposes independent of a highly reflective characteristic of mask portion 65.

Preferably, mask portion 65 is produced by incorporation of an opaque highly reflective material 71, and the indentations of sheet 61 by a process similar to that previously described with reference to FIG. 3 for example.

In FIG. 7, higher elevation rays 69 and lower elevation rays 68 show the approximate range of angles of solar radiation which pass through windows 63. The panel supporting film 60 is shown tilted only slightly, and for the position shown the acceptance range for solar radiation may be about 22° to about 42°. The lower acceptance angles for the windows 63 in FIG. 7 could be suitable for a building located in a Northerly latitude of about 45°.

Backing sheet 73 is provided for the sheet 61 which serves to confine at least temporarily the opaque material 71 and which in the FIG. 7 embodiment interfaces intimately at windows 63 to provide high transparency for medium elevation rays with elevations intermediate those of rays 68 and rays 69. By a slight modification of the shape of sheet 73, a thin gap or air space could be provided which would not interfere with the transmission of such intermediate elevation rays, but would be totally internally reflective for rays at low elevation angles, and negative elevation angles. With such a configuration in FIG. 7, a passerby with a viewpoint from a low elevation angle or a negative elevation angle would not see through window 63, but would see a reflection of surface 67 due to the total reflection properties of window 63 for rays at such an elevation angle.

Figure 8:
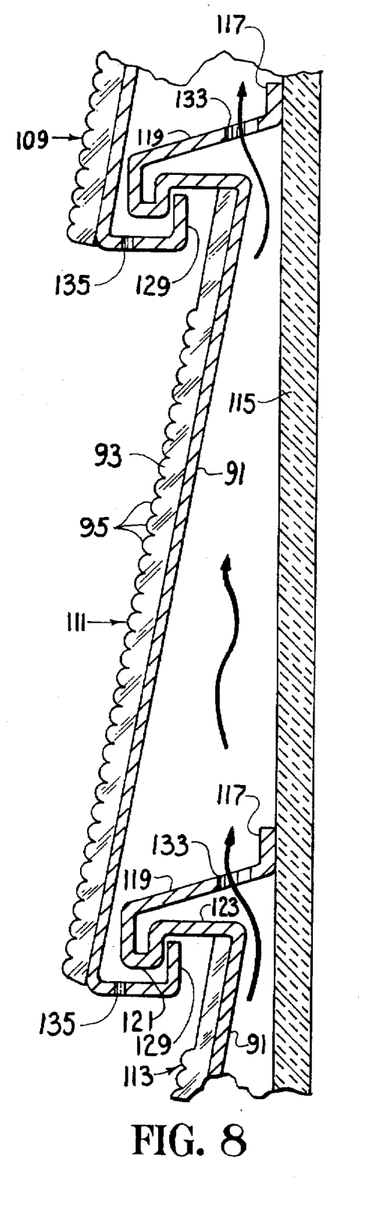
FIG. 8 shows a form of opaque siding panel providing controlled heat exchange in a system utilizing solar control film according to the present invention.

FIG. 8 shows siding panels incorporating film for controlled solar heating according to the invention. The siding panels illustrated in FIG. 8 have a configuration and outward appearance generally similar to conventional aluminum siding employed in the residential building industry for decades. That is, they constitute 4, 5, or 6 inch wide strips about eight feet long or longer secured in a horizontal array and generally provided with an overlapping, interlocking arrangement for easy installation and neat appearance. Aluminum siding is generally painted or otherwise coated with a decorative and protective material such as polyvinyl chloride.

While aluminum siding is probably the most common, similar siding is formed using other materials such as steel, plastic, or the like. Conventional siding panels are well known and are illustrated and described for example in U.S. Pat. No. 4,557,253 referred to above.

In FIG. 8, siding panels 111 and 113 are shown in section to illustrate how an upper panel 111 interlocks with a lower panel 113. Each panel 111 or 113 is provided with a top flange 119 extending horizontally alone substantially its entire length. Flanges 119 include straps 117 to facilitate attachment of the panel 113 to a conventional insulated wall 115 of a residential or other building structure. Attachment of strap 117 to wall 115 may be by any conventional means (not shown).

Flange 119 preferably has a serpentine form including a projection 121 and an indentation 123 to interlock with a hook-like flange 129 on an upwardly adjacent panel. As seen in FIG. 8 optional weep holes 135 may be provided at intervals in the flange 129 to assure that water is not trapped at flanges 129. Weep holes 135 may be very small and widely spaced so that they permit little air flow through the exterior wall formed by panels 111 and 113.

Vertical air flow between panels 111 and 113 and wall 115 passes through openings 133 in flanges 119. Openings 133 are much larger than any weep holes 135 and may be on the order of one-half to one inch in diameter. They are also closely spaced so that they cause little resistance to vertical air flow in the space between panels 111, 113 and wall 115.

As illustrated in FIG. 8, panels 111 and 113 are formed of aluminum or steel sheet 91 covered with a layer of transparent polyvinyl chloride, acrylic or polycarbonate plastic material 93, and integrally formed therein is an array 95 of lenses, which is illustrated as lenticular cylindrical lenses, the detailed construction of which is shown in FIG. 1, 2 or 7.

In the previous discussion, only direct solar radiation and not other radiation from the sky has been considered. This is a practical approach since the greatest part of utilizable solar radiation is direct solar radiation. If radiation other than direct solar radiation were considered, it would add a small but significant amount of additional usable solar energy in the winter time; and in the summer time the amount of such energy would be insufficient to have any material effect, particularly in view of the fact that heated air between panels 109, 111, 113 and the insulated wall 115 need not be conveyed into the building and could be allowed to escape to the atmosphere.

From the foregoing description and discussion it will be apparent that solar energy control film according to the present invention has a configuration which is simple and efficient to manufacture, and is suitable for application on a wide variety of wall covering material such as siding or the like, and also, on windows, skylights, or other similar structures in residences, commercial, or industrial buildings. While this is the presently contemplated most beneficial use of film according to the invention, it has potential use in any situation where accurate and complete control of light transmission of light rays from various directions is desired. Light is understood to include both infrared and ultraviolet light as well as visible light.

While the process illustrated as the preferred process for producing film according to the invention has numerous advantages, film according to the invention could be produced by different processes. For example, backing sheet 49 as shown in FIG. 3 could be omitted and liquid or semi-liquid material 45 could be removed from the back surface of sheet 37 by a squeegee or a similar process to produce the transparent window portions on the back of the solar energy control film. In some configurations such as that shown in FIG. 2, the opaque material 28 in indentations 27 could be omitted and reliance placed upon total internal reflection for obtaining reflectivity from the surfaces of indentations 27. Although the structure in FIG. 8 utilizes conventional metal (opaque) siding panels for backing the solar energy control film, such panels could be formed of transparent plastic which would allow solar energy to pass through to insulating wall 115, which would preferably have a dark energy absorbing surface for such solar radiation energy.

In addition to the variations and modifications to the invention shown, described or suggested above, other variations and modifications will be apparent to those of ordinary skill in the art, and accordingly the scope of the invention is not to be considered limited to those embodiments shown or suggested, but is rather to be determined by reference to the appended claims.

What is claimed is:

1. A sheet material having an array of lenses formed therein and a plurality of opaque mask elements in register with said lenses, said sheet material being produced by the process steps of:

(a) embossing roll forming a first sheet having a front surface and a back surface from a transparent plastic material with said front surface having a surface contour including a multiplicity of adjacent curved convex elements less than 3 millimeter in width and said back surface having separated indented portions in register with said curved convex elements, intervening portions of said back surface between said indented portions being substantially smooth and flat surfaces, (b) applying a non-transparent liquid to said back surface, and (c) pressing the back surface of said first sheet firmly against a solid, generally smooth surface to substantially expel said liquid from said intervening portions and fill said indented portions with said liquid.

2. A sheet material formed by the process as recited in claim 1 wherein said convex elements are elongated cylindrical surfaces less than 2 millimeters in width and are parallel.

3. A sheet material formed by the process as recited in claim 2 wherein said first sheet has a greatest thickness dimension at least half the width of said cylindrical surfaces.

4. A sheet material formed by the process as recited in claim 1 further including the step of bonding said first sheet to a second sheet at said intervening portions of said back surface.

5. A sheet material formed by the process as recited in claim 4 wherein said second sheet is substantially coextensive with said first sheet.

6. A sheet material formed by the process as recited in claim 1 wherein said indented portions have a greatest depth from 0.1 times to 0.8 times the least thickness of said sheet.

7. A sheet material formed by the process as recited in claim 6 wherein said liquid is sufficiently opaque to prevent visible or longer wavelengths of light from being transmitted through said indented portions with a transmission factor of greater than 10 per cent.

* * * * *

UNITED STATES PATENT AND TRADEMARK OFFICE
CERTIFICATE OF CORRECTION

PATENT NO. : 5,680,734

DATED : October 28, 1997

INVENTOR(S) : John Allan MAGEE

It is certified that error appears in the above-identified patent and that said Letters Patent is hereby corrected as shown below:

In the ABSTRACT, line 4, delete "preferable" and substitute --preferably-- therefor;

Col. 2, line 34, after "forth," insert --for--;

Col. 2, line 49, delete "reelected" and substitute --reflected-- therefor;

Col. 3, line 45, delete "is" and substitute --18-- therefor;

Col. 3, line 55, after "circumstances" and before "include" insert --may--;

Col. 4, line 13, after "lenses" and before "the" insert --in--;
Col. 5, line 15, after "and" delete ";" ; and Col. 8, line 54, delete "alone" and substitute --along-- therefor.

Signed and Sealed this

Seventeenth Day of March, 1998

*Attest:*

BRUCE LEHMAN

*Attesting Officer*     *Commissioner of Patents and Trademarks*